United States Patent
Cheraghi et al.

(10) Patent No.: US 11,159,219 B2
(45) Date of Patent: Oct. 26, 2021

(54) FREQUENCY DOMAIN SEGMENTATION FOR PERFORMANCE ENHANCEMENT OF CHANNEL STATE FEEDBACK

(71) Applicant: QUALCOMM Incorporated, San Diego, CA (US)

(72) Inventors: Parisa Cheraghi, San Diego, CA (US); Md Jahidur Rahman, San Diego, CA (US); Sharon Levy, Binyamina (IL); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/084,550

(22) Filed: Oct. 29, 2020

(65) Prior Publication Data
US 2021/0135729 A1 May 6, 2021

Related U.S. Application Data

(60) Provisional application No. 62/928,945, filed on Oct. 31, 2019.

(51) Int. Cl.
*H04B 7/02* (2018.01)
*H04B 7/06* (2006.01)
*H04B 7/0417* (2017.01)

(52) U.S. Cl.
CPC ......... *H04B 7/0632* (2013.01); *H04B 7/0417* (2013.01)

(58) Field of Classification Search
CPC ........................... H04B 7/0632; H04B 7/0417
USPC ............... 375/267, 261, 259, 219, 295, 316
See application file for complete search history.

(56) References Cited

U.S. PATENT DOCUMENTS

| | | |
|---|---|---|
| 2008/0207135 A1 | 8/2008 | Varadarajan et al. |
| 2008/0305745 A1 | 12/2008 | Zhang et al. |
| 2012/0163208 A1 | 6/2012 | Kamble et al. |
| 2020/0228282 A1 | 7/2020 | Kwak et al. |

OTHER PUBLICATIONS

International Search Report and Written Opinion—PCT/US2020/058409—ISA/EPO—dated Feb. 15, 2021.

*Primary Examiner* — Zewdu A Kassa
(74) *Attorney, Agent, or Firm* — Quarles & Brady LLP

(57) ABSTRACT

Aspects of the disclosure relate to a wireless user equipment (UE) determining a wideband channel quality indicator (CQI) in a wireless communication network. For each of a plurality of CQI hypotheses, a UE divides a bandwidth into a plurality of frequency segments and determines an average spectral efficiency (SPEF) for each of those segments. Further, for each of the plurality of CQI hypotheses, the UE determines the minimum of the average SPEFs. The UE selects the CQI hypothesis corresponding to the maximum from among these determined minimum average SPEFs, and transmits this selected CQI as a wideband CQI. Other aspects, embodiments, and features are also claimed and described.

30 Claims, 11 Drawing Sheets

FIG. 8

| CQI Hypothesis | Rank 1 | | | | Rank 2 | | | | Rank 3 | | | | Rank 4 | | | |
|---|---|---|---|---|---|---|---|---|---|---|---|---|---|---|---|---|
| | 4 | 8 | 16 | 32 | 4 | 8 | 16 | 32 | 4 | 8 | 16 | 32 | 4 | 8 | 16 | 32 |
| CQI 1 | 1150 | 575 | 288 | 144 | 575 | 288 | 144 | 72 | 384 | 192 | 96 | 48 | 288 | 144 | 72 | 36 |
| CQI 2 | 465 | 233 | 117 | 59 | 233 | 117 | 59 | 30 | 155 | 78 | 39 | 20 | 117 | 59 | 30 | 15 |
| CQI 3 | 202 | 101 | 51 | 26 | 101 | 51 | 26 | 13 | 68 | 34 | 17 | 9 | 51 | 26 | 13 | 7 |
| CQI 4 | 120 | 60 | 30 | 15 | 60 | 30 | 15 | 8 | 40 | 20 | 10 | 5 | 30 | 15 | 8 | 4 |
| CQI 5 | 92 | 46 | 23 | 12 | 46 | 23 | 12 | 6 | 31 | 16 | 8 | 4 | 23 | 12 | 6 | 3 |
| CQI 6 | 73 | 37 | 19 | 10 | 37 | 19 | 10 | 5 | 25 | 13 | 7 | 3 | 19 | 10 | 5 | 3 |
| CQI 7 | 65 | 33 | 17 | 9 | 33 | 17 | 9 | 5 | 22 | 11 | 6 | 3 | 17 | 9 | 5 | 3 |
| CQI 8 | 53 | 27 | 14 | 7 | 27 | 14 | 7 | 4 | 18 | 9 | 5 | 2 | 14 | 7 | 4 | 2 |
| CQI 9 | 45 | 23 | 12 | 6 | 23 | 12 | 6 | 3 | 15 | 8 | 4 | 2 | 12 | 6 | 3 | 2 |
| CQI 10 | 39 | 20 | 10 | 5 | 20 | 10 | 5 | 3 | 13 | 7 | 4 | 2 | 10 | 5 | 3 | 2 |
| CQI 11 | 35 | 18 | 9 | 5 | 18 | 9 | 5 | 2 | 12 | 6 | 3 | 2 | 9 | 5 | 2 | 1 |
| CQI 12 | 32 | 16 | 8 | 4 | 16 | 8 | 4 | 2 | 11 | 6 | 3 | 2 | 8 | 4 | 2 | 1 |
| CQI 13 | 29 | 15 | 8 | 4 | 15 | 8 | 4 | 2 | 10 | 5 | 3 | 2 | 8 | 4 | 2 | 1 |
| CQI 14 | 26 | 13 | 7 | 4 | 13 | 7 | 4 | 2 | 9 | 5 | 2 | 2 | 7 | 4 | 2 | 1 |
| CQI 15 | 24 | 12 | 6 | 3 | 12 | 6 | 3 | 2 | 8 | 4 | 2 | 1 | 6 | 3 | 2 | 1 |

FREQUENCY DOMAIN SEGMENTATION FOR PERFORMANCE ENHANCEMENT OF CHANNEL STATE FEEDBACK

PRIORITY CLAIM

This application claims priority to and the benefit of provisional patent application No. 62/928,945, filed in the United States Patent and Trademark Office (USPTO) on Oct. 31, 2019, the entire content of which is incorporated herein by reference as if fully set forth below in its entirety and for all applicable purposes.

TECHNICAL FIELD

The technology discussed below relates generally to wireless communication systems, and more particularly, to channel state feedback. Embodiments can provide and enable techniques for generating a robust channel quality indicator.

INTRODUCTION

In a wireless communication system, wireless user equipment (UE) often transmit channel state feedback (CSF) to a radio access network (RAN). This CSF can include a wide variety of parameters, among which may be included a channel quality indicator (CQI).

A UE may utilize the CQI to indicate a suitable data rate for the RAN to utilize for downlink data transmissions. CQI may include a value that represents a modulation and coding scheme (MCS) for the downlink. For example, a UE may determine a signal to interference and noise ratio (SINR) and/or spectral efficiency (SPEF) based on the reference signals configured for CSF, and may then select a 4-bit integer based on the determined SINR/SPEF to act as the CQI.

Accurate CQI determination is important for a UE to maximize its throughput based on the channel conditions. Furthermore, the accuracy of the CQI can improve the reliability of the communication link.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for a wireless user equipment (UE) to generate a channel quality indicator (CQI) corresponding to a bandwidth that includes a plurality of physical resource blocks (PRBs) is disclosed. The method includes receiving a reference signal in each of the plurality of PRBs. For each of a plurality of CQI hypotheses, the method further includes dividing the bandwidth into a plurality of frequency segments, determining, for each frequency segment for the corresponding CQI hypothesis, an average spectral efficiency (SPEF) based on the reference signal in each PRB of the corresponding frequency segment, and determining a minimum average SPEF from among the average SPEFs corresponding to the plurality of frequency segments for the corresponding CQI hypothesis. Each frequency segment of the plurality of frequency segments includes a set of the plurality of PRBs. Then, the method includes selecting a CQI hypothesis from among the plurality of CQI hypotheses. The CQI hypothesis corresponds to a maximum SPEF from among the minimum average SPEFs corresponding to the plurality of CQI hypotheses. The method finally includes transmitting a channel state feedback comprising the selected CQI.

In another example, a user equipment (UE) is configured for wireless communication over a bandwidth that includes a plurality of physical resource blocks (PRBs). The UE includes a processor, a transceiver communicatively coupled to the processor; and a memory communicatively coupled to the processor. The processor and the memory are configured for receiving a reference signal in each of the plurality of PRBs. For each of a plurality of CQI hypotheses, the processor and the memory are configured for dividing the bandwidth into a plurality of frequency segments, determining, for each frequency segment for the corresponding CQI hypothesis, an average spectral efficiency (SPEF) based on the reference signal in each PRB of the corresponding frequency segment, and determining a minimum average SPEF from among the average SPEFs corresponding to the plurality of frequency segments for the corresponding CQI hypothesis. Each frequency segment of the plurality of frequency segments includes a set of the plurality of PRBs. Then, the processor and memory are further configured for selecting a CQI hypothesis from among the plurality of CQI hypotheses. The CQI hypothesis corresponds to a maximum SPEF from among the minimum average SPEFs corresponding to the plurality of CQI hypotheses. The processor and memory are finally configured for transmitting a channel state feedback comprising the selected CQI.

In another example, a user equipment (UE) is configured for wireless communication over a bandwidth that includes a plurality of physical resource blocks (PRBs). The UE includes means for receiving a reference signal in each of the plurality of PRBs. For each of a plurality of CQI hypotheses, the UE further includes means for dividing the bandwidth into a plurality of frequency segments, means for determining, for each frequency segment for the corresponding CQI hypothesis, an average spectral efficiency (SPEF) based on the reference signal in each PRB of the corresponding frequency segment, and means for determining a minimum average SPEF from among the average SPEFs corresponding to the plurality of frequency segments for the corresponding CQI hypothesis. Each frequency segment of the plurality of frequency segments includes a set of the plurality of PRBs. The UE further includes means for selecting a CQI hypothesis from among the plurality of CQI hypotheses. The CQI hypothesis corresponds to a maximum SPEF from among the minimum average SPEFs corresponding to the plurality of CQI hypotheses. The UE includes means for transmitting a channel state feedback comprising the selected CQI.

In another example, a non-transitory computer readable medium storing computer executable code includes code for causing a user equipment (UE) to generate a channel quality indicator (CQI) corresponding to a bandwidth that includes a plurality of physical resource blocks (PRBs). The code includes instructions for causing the UE to receive a reference signal in each of the plurality of PRBs. For each of a plurality of CQI hypotheses, the code further includes instructions for dividing the bandwidth into a plurality of frequency segments, determining, for each frequency segment for the corresponding CQI hypothesis, an average spectral efficiency (SPEF) based on the reference signal in each PRB of the corresponding frequency segment, and determining a minimum average SPEF from among the average SPEFs corresponding to the plurality of frequency segments for the corresponding CQI hypothesis. Each frequency segment of the plurality of frequency segments includes a set of the plurality of PRBs. Then, the code includes instructions for selecting a CQI hypothesis from among the plurality of CQI hypotheses. The CQI hypothesis corresponds to a maximum SPEF from among the minimum average SPEFs corresponding to the plurality of CQI hypotheses. The code includes instructions for transmitting a channel state feedback comprising the selected CQI. Other aspects, embodiments, and features are also claimed and described.

In another example, a method of wireless communication operable at a user equipment (UE) is disclosed. The method includes receiving a plurality of reference signals in a plurality of physical resource blocks (PRBs) corresponding to a bandwidth. For each of a plurality of CQI hypotheses, the method also includes dividing the bandwidth into one or more frequency segments; determining one or more average spectral efficiencies (SPEFs) corresponding to the one or more frequency segments based on one or more sets of reference signals of the plurality of reference signals corresponding to the one or more frequency segments; and selecting a first SPEF from among the one or more average SPEFs. A frequency segment of the one or more frequency segments includes a set of the plurality of PRBs. Then, the method includes selecting a second SPEF from among a plurality of first SPEFs corresponding to the plurality of CQI hypotheses; selecting, for the bandwidth, a wideband CQI hypothesis from among the plurality of CQI hypotheses, the wideband CQI hypothesis corresponding to the second SPEF; and transmitting a channel state feedback comprising the wideband CQI.

In another example, a user equipment (UE) is configured for wireless communication. The UE includes a processor, a transceiver communicatively coupled to the processor; and a memory communicatively coupled to the processor. The processor and the memory are configured for receiving a plurality of reference signals in a plurality of physical resource blocks (PRBs) corresponding to a bandwidth. For each of a plurality of CQI hypotheses, the processor and the memory are further configured for dividing the bandwidth into one or more frequency segments; determining one or more average spectral efficiencies (SPEFs) corresponding to the one or more frequency segments based on one or more sets of reference signals of the plurality of reference signals corresponding to the one or more frequency segments; and selecting a first SPEF from among the one or more average SPEFs. A frequency segment of the one or more frequency segments includes a set of the plurality of PRBs. Then, the processor and the memory are further configured for selecting a second SPEF from among a plurality of first SPEFs corresponding to the plurality of CQI hypotheses; selecting, for the bandwidth, a wideband CQI hypothesis from among the plurality of CQI hypotheses, the wideband CQI hypothesis corresponding to the second SPEF; and transmitting a channel state feedback comprising the wideband CQI.

In another example, a user equipment (UE) is configured for wireless communication. The UE includes means for means for receiving a plurality of reference signals in a plurality of physical resource blocks (PRBs) corresponding to a bandwidth. For each of a plurality of CQI hypotheses, the UE further includes means for dividing the bandwidth into one or more frequency segments; means for determining one or more average spectral efficiencies (SPEFs) corresponding to the one or more frequency segments based on one or more sets of reference signals of the plurality of reference signals corresponding to the one or more frequency segments, and means for selecting a first SPEF from among the one or more average SPEFs. A frequency segment of the one or more frequency segments includes a set of the plurality of PRBs. Then the UE further includes means for selecting a second SPEF from among a plurality of first SPEFs corresponding to the plurality of CQI hypotheses; means for selecting, for the bandwidth, a wideband CQI hypothesis from among the plurality of CQI hypotheses, the wideband CQI hypothesis corresponding to the second SPEF; and means for transmitting a channel state feedback comprising the wideband CQI.

In another example, a non-transitory computer readable medium storing computer executable code includes code for wireless communication operable at a user equipment (UE). The code includes instructions for causing the UE to receive a plurality of reference signals in a plurality of physical resource blocks (PRBs) corresponding to a bandwidth. For each of a plurality of CQI hypotheses, the code further includes instructions for causing the UE to divide the bandwidth into one or more frequency segments; determine one or more average spectral efficiencies (SPEFs) corresponding to the one or more frequency segments based on one or more sets of reference signals of the plurality of reference signals corresponding to the one or more frequency segments; and select a first SPEF from among the one or more average SPEFs. A frequency segment of the one or more frequency segments includes a set of the plurality of PRBs. Then, the code further includes instructions for causing the UE to select a second SPEF from among a plurality of first SPEFs corresponding to the plurality of CQI hypotheses; select, for the bandwidth, a wideband CQI hypothesis from among the plurality of CQI hypotheses, the wideband CQI hypothesis corresponding to the second SPEF; and transmit a channel state feedback comprising the wideband CQI.

In another example, a method of wireless communication operable at a user equipment (UE) is disclosed. The method includes receiving a plurality of reference signals associated with a plurality of physical resource blocks (PRBs) corresponding to a bandwidth. For each of a plurality of CQI hypotheses, the method further include determining one or more average spectral efficiencies (SPEFs) corresponding to one or more frequency segments of the bandwidth based on one or more sets of reference signals of the plurality of reference signals corresponding to the one or more frequency segments, and selecting a first SPEF from among the one or more average SPEFs. Then, the method further includes selecting a second SPEF from among a plurality of first SPEFs corresponding to the plurality of CQI hypotheses; and transmitting channel state feedback comprising a wideband CQI corresponding to the second SPEF.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 is a table that a UE may utilize for generating a wideband CQI according to some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
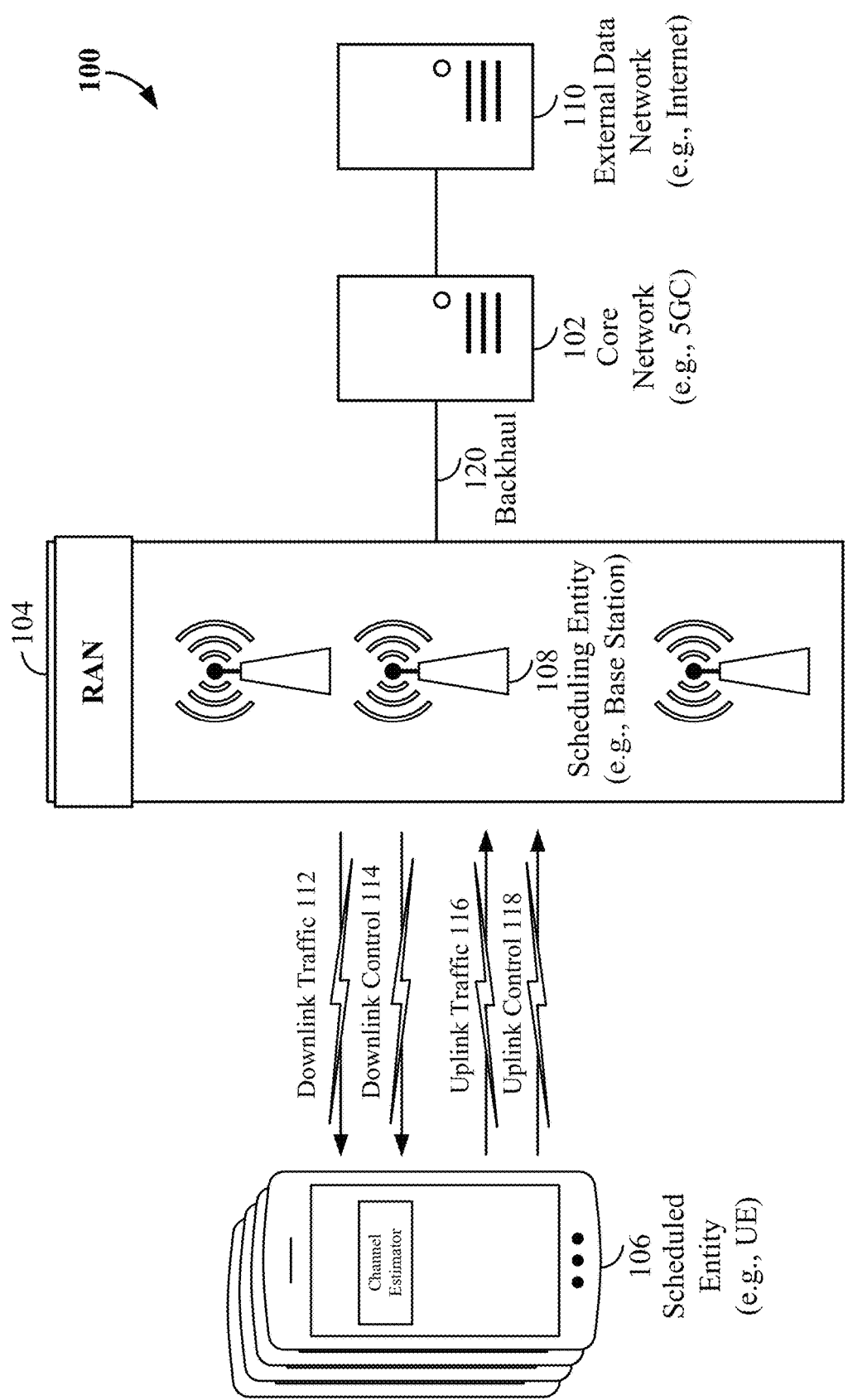
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus or a modem) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology (RAT) used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
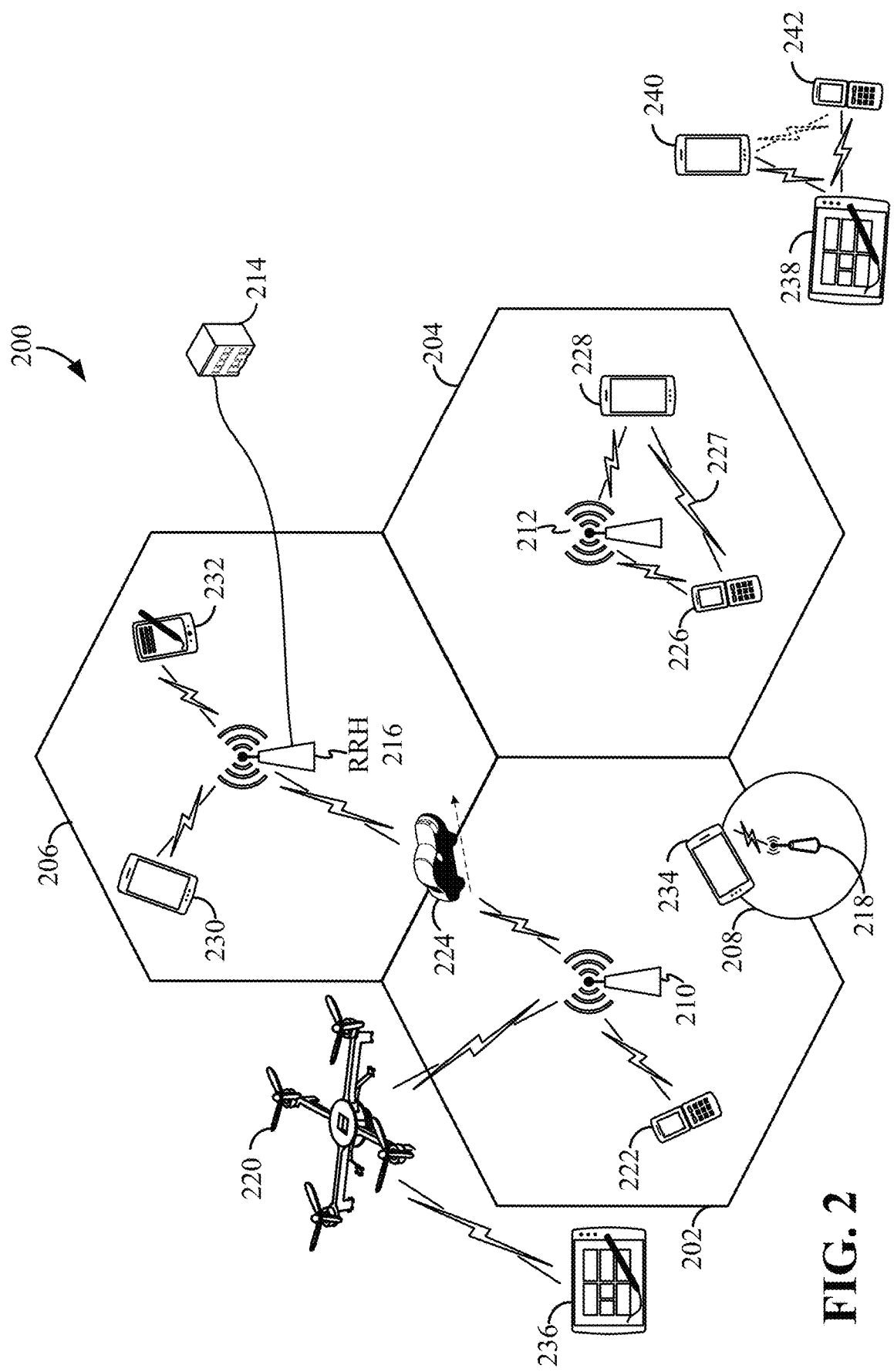
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

During a call with a scheduling entity, or at any other time, a UE may monitor various parameters of one or more reference signals (RS) transmitted from its serving cell as well as RSs of neighboring cells. Depending on the quality of these parameters, the UE may maintain communication with one or more of the neighboring cells. During this time, if the UE moves from one cell to another, or if, for example, the reference signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the reference signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
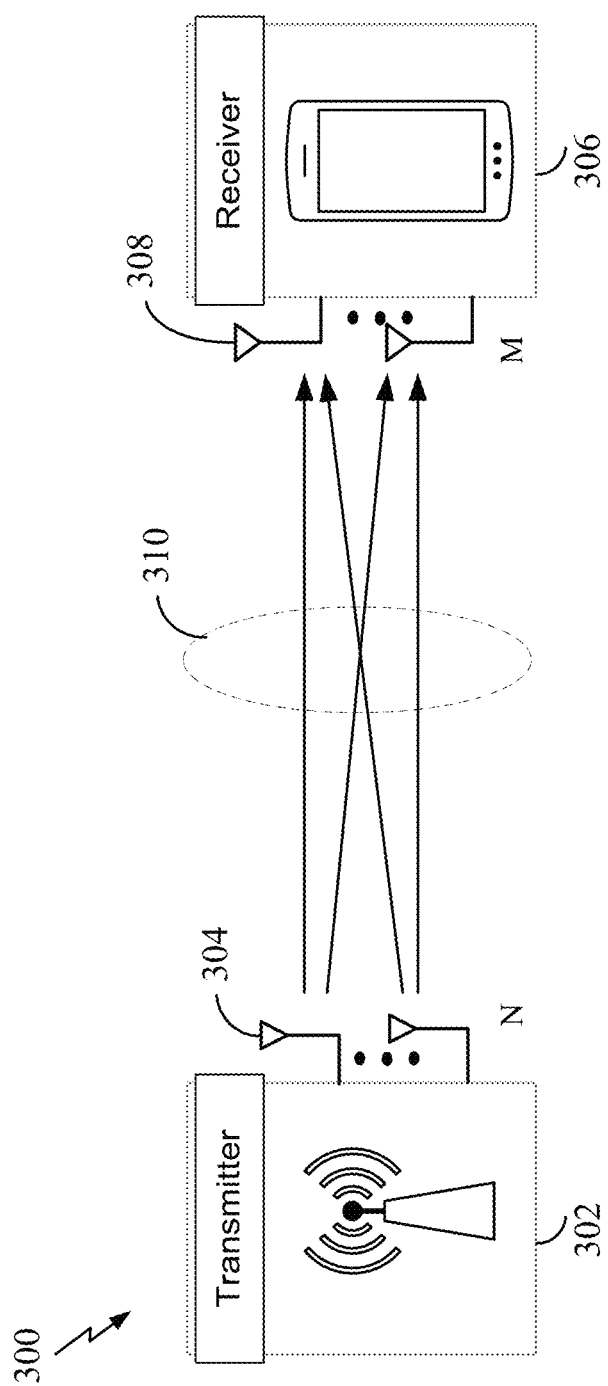
FIG. 3 is a block diagram illustrating a wireless communication system supporting multiple-input multiple-output (MIMO) communication according to some aspects.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, the amplitude and phase of each antenna in an array of antennas may be precoded, or controlled to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, transmitter may send multiple data streams to a single receiver. In this way, a MIMO system takes advantage of capacity gains and/or increased data rates associated with using multiple antennas in rich scattering environments where channel variations can be tracked. Here, the receiver may track these channel variations and provide corresponding feedback to the transmitter. In the simplest case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. The receiver may transmit feedback including a quantized version of the channel so that the transmitter can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiving device, as well as other considerations, such as the available resources at the transmitting device, may also affect the transmission rank. For example, a base station in a cellular RAN may assign a rank (and therefore, a number of data streams) for a DL transmission to a particular UE based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI along with resource information (e.g., the available resources and amount of data to be scheduled for the UE) to assign a DL transmission rank to the UE.

The transmitting device determines the precoding of the transmitted data stream or streams based, e.g., on known channel state information of the channel on which the transmitting device transmits the data stream(s). For example, the transmitting device may transmit one or more suitable reference signals (e.g., a channel state information reference signal, or CSI-RS) that the receiving device may measure. The receiver may then report measured channel quality information (CQI) back to the transmitting device. This CQI generally reports the current communication channel quality, and in some examples, a requested transport block size (TBS) for future transmissions to the receiver. In some examples, the receiver may further report a precoding matrix indicator (PMI) back to the transmitting device. This PMI generally reports the receiving device's preferred precoding matrix for the transmitting device to use, and may be indexed to a predefined codebook. The transmitting device may then utilize this CQI/PMI to determine a suitable precoding matrix for transmissions to the receiver.

In Time Division Duplex (TDD) systems, the UL and DL may be reciprocal, in that each uses different time slots of the same frequency bandwidth. Therefore, in TDD systems, the base station may assign the Rank for DL MIMO transmissions based on UL SINR measurements (e.g., based on a Sounding Reference Signal (SRS) transmitted from the UE or other pilot signal). Based on the assigned Rank, the base station may then transmit the CSI-RS with separate C-RS sequences for each layer to provide for multi-layer channel estimation. From the CSI-RS, the UE may measure the channel quality across layers and resource blocks and send back the CQI and RI values to the base station for use in updating the Rank and assigning REs for future downlink transmissions.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message to convert data into codewords. Exploitation of this redundancy in the encoded information message can improve the reliability of the message, enabling correction for any bit errors that may occur due to the noise.

In 5G NR specifications, user data may be coded using quasi-cyclic low-density parity check (LDPC) coding with two different base graphs: one base graph for large code blocks and/or high code rates, while the other base graph is used otherwise. Control information and the physical broadcast channel (PBCH) may be coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM)

with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, ach RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
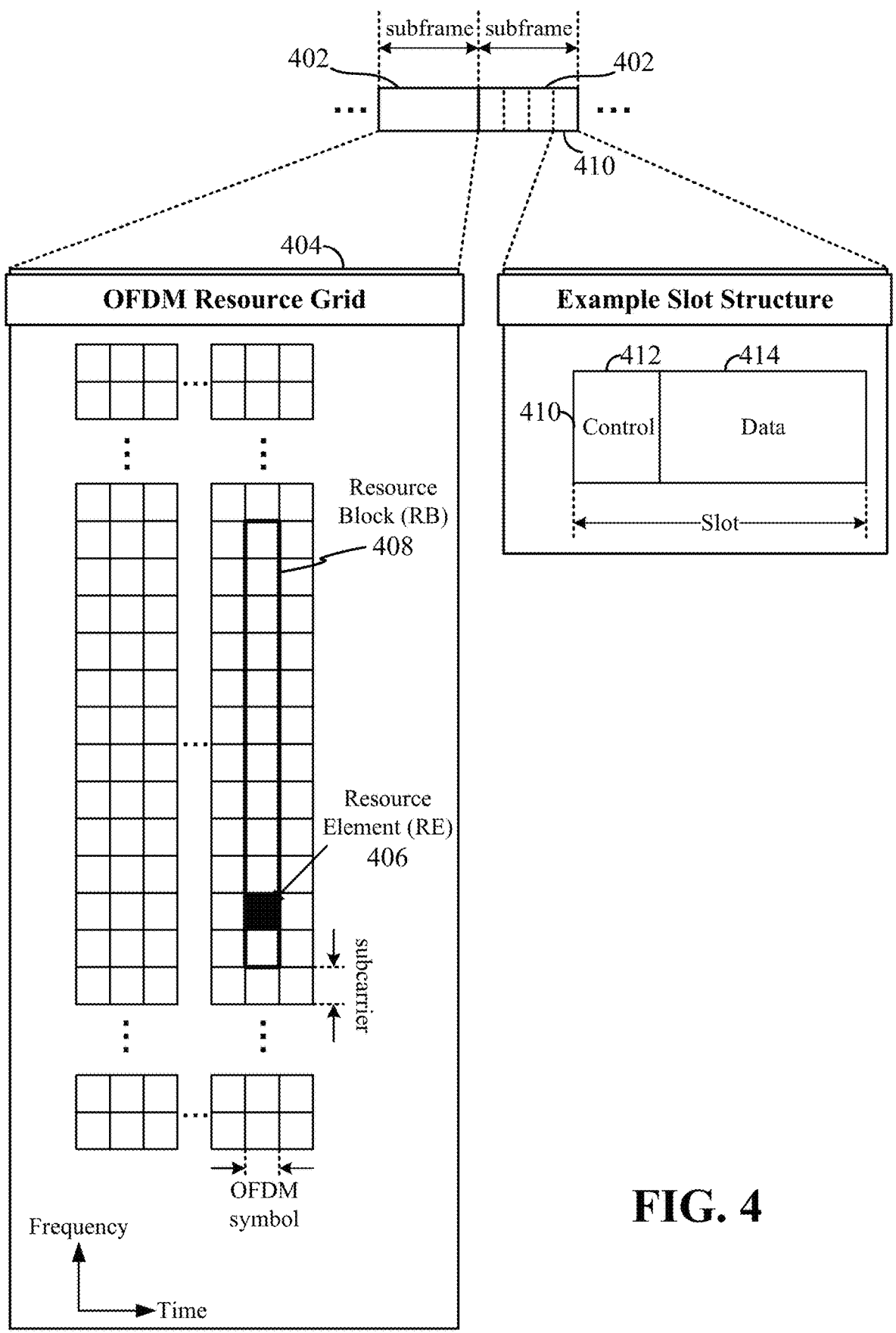
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers (e.g., a radio resource control (RRC) layer), such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include synchronization signals such as a primary synchronization signal (PSS) or a secondary synchronization signal (SSS). DL physical signals can additionally or alternatively include reference signals (RS) such as demodulation reference signals (DM-RS) or phase-tracking reference signals (PT-RS). Some additional RSs may be for channel state feedback (CSF) purposes. Such RSs may include channel measurement resources (CMR) and interference measurement resources (IMR). For example, a CMR may include a non-zero power (NZP) channel state indication (CSI) reference signal, or NZP CSI-RS. An IMR may include a CSI-RS for interference measurement (CS-IM). In another example, an IMR may include an NZP CSI-RS.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state feedback (CSF), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. Channel state feedback (CSF) is discussed further below.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 5:
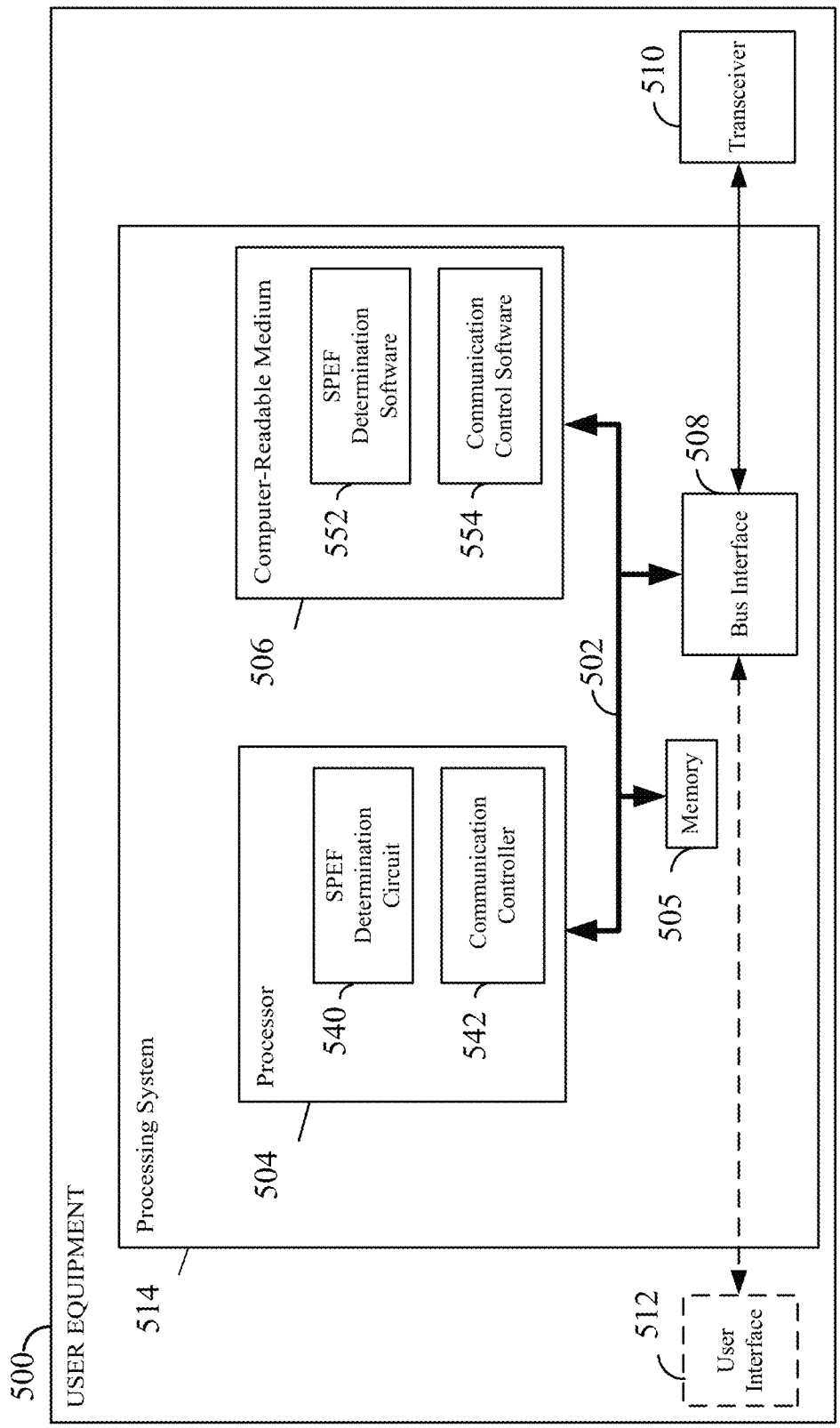
FIG. 5 is a block diagram conceptually illustrating an example of a hardware implementation for a user equipment (UE) according to some aspects of the disclosure.

FIG. 5 is a block diagram illustrating an example of a hardware implementation for a wireless user equipment (UE) 500 employing a processing system 514. For example, the UE 500 may be a base station as illustrated in any one or more of FIGS. 1, 2, and/or 3.

The UE 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 500 may be configured to perform any one or more of the functions described herein. That is, the processor 504, as utilized in a UE 500, may be used to implement any one or more of the processes and procedures described below and illustrated in FIGS. 7, 8, 10, and/or 11.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include SPEF determination circuitry 540 configured for various functions, including, for example, determining an average SPEF for each frequency segment for each CQI hypothesis based on reference signals in PRBs of the frequency segment. For example, the SPEF determination circuitry 540 may be configured to implement one or more of the functions described in relation to FIG. 7, including, e.g., block 704, FIG. 10, e.g., block 1006, and/or FIG. 11, e.g., block 1106. The processor 504 may further include a communication controller 542 configured for various function, including, e.g., receiving a reference signal of PRBs, dividing the bandwidth into frequency segments, determining a number of the PRBs in a frequency segment, determining a number of subbands in a frequency segment, determining a minimum average SPEF from among the average SPEFs corresponding to the frequency segments for each CQI hypothesis, selecting a maximum SPEF from among the minimum average SPEFs of CQI hypotheses, and/or transmitting a channel state feedback including the selected maximum SPEF as a wideband CQI hypothesis. For example, the communication controller 542 may be configured to implement one or more of the functions described in relation to FIG. 7, including, e.g., blocks 702, 706, 708, and/or 710, FIG. 10, e.g., blocks 1002, 1004, 1008, 1010, and/or 1012, and/or FIG. 11, e.g., block 1102, 1104, 1108, 1110, and/or 1112.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may store computer executable codes that includes SPEF determination software 552 that configures a UE for various functions, including, for example, determining an average SPEF for each frequency segment for each CQI hypothesis based on reference signals in PRBs of the frequency segment. For example, the SPEF determination software 552 may be configured to cause the UE 500 to implement one or more of the function described below in relation to FIG. 7, including, e.g., block 704, FIG. 10, e.g., block 1006, and/or FIG. 11, e.g., block 1106. The computer-readable storage medium 506 may further store computer executable codes that includes communication control software 554 configured for various function, including, e.g., receiving a reference signal of PRBs, dividing the bandwidth into frequency segments, determining a number of the PRBs in a frequency segment, determining a number of subbands in a frequency segment, determining a minimum average SPEF from among the average SPEFs corresponding to the frequency segments for each CQI hypothesis, selecting a maximum SPEF from among the minimum average SPEFs of CQI hypotheses, and/or transmitting a channel state feedback including the selected maximum SPEF as a wideband CQI hypothesis. For example, the communication control software 554 may be configured to implement one or more of the functions described in relation to FIG. 7, including, e.g., blocks 702, 706, 708, and/or 710, FIG. 10, e.g., blocks 1002, 1004, 1008, 1010, and/or 1012, and/or FIG. 11, e.g., block 1102, 1104, 1108, 1110, and/or 1112.

As discussed above, a UE may generate channel state feedback (CSF) to provide channel state information to a radio access network (RAN). Certain features of a 5G NR-capable network, such as Ultra-Reliable Low-Latency Communication (URLLC), millimeter wave (mmWave) communication and MIMO, may rely heavily on the presence of high-quality CSF. The 5g NR-capable network may include mmWave techniques targeting high bands (e.g., above 24 GHz) which can provide a very large bandwidth, and communications and URLLC techniques targeting high reliability (e.g., a packet success rate greater than 99.999%) and low latency (e.g., 1 ms or even 0.5 ms). For example, without suitable CSF, a URLLC link may not sustainable, or may have reduced throughput. And beamforming and MIMO generally employ CSF to generate suitable precoding matrices for transmission.

A UE may compute, determine, identify, and/or indicate one or more parameters for CSF. CSF can be based on a variety of factors. For example, CSF may be based on received RSs. UEs may transmit CSF to other wireless components in a RAN (e.g., a BS or another UE). Such CSF parameters may include, but are not limited to, a channel quality indicator (CQI), a precoding matrix indicator (PMI), a CSI-RS resource indicator (CRI), a strongest layer indicator (SLI), a Rank indicator (RI), etc.

Among the above-described CSF parameters, a UE may utilize the CQI to indicate a suitable data rate for the RAN to utilize for downlink data transmissions. For example, the CQI may be a value that represents a modulation and coding scheme (MCS) for the downlink.

For example, a UE may determine a signal to interference and noise ratio (SINR) and/or spectral efficiency (SPEF) based on the reference signals configured for CSF, and may then select a 4-bit integer based on the determined SINR/SPEF to act as the CQI. Of course, this is merely one example provided for clarity, but a UE may employ any suitable format to convey SINR and/or SPEF information.

For a wideband CQI, in general, a UE may divide a wide band into smaller frequency segments, and determine the average SPEF across the wide band based on the CSI-RS or CSI-IM for each of those smaller segments. Here, the average SPEF across all segments of the band can be used to generate the wideband CQI.

Accurate CQI determination is important, for example, for a UE to maximize its throughput based on the channel conditions. Furthermore, the accuracy of the CQI can improve the reliability of the communication link.

Various aspects of the present disclosure relate to apparatus, methods, and algorithms for a UE to provide an accurate and robust CQI.

The RAN performs a variety of configuration processes before transmitting encoded downlink data on the physical downlink shared channel (PDSCH). In some examples, these processes include channel coding, scrambling the codewords, modulating the scrambled codewords, layer mapping, antenna port mapping, and mapping to virtual resource blocks. Further, a RAN node may map virtual resource blocks (VRBs) to physical resource blocks (PRBs) on the PDSCH.

For mapping VRBs to PRBs, in an exemplary network that conforms to specifications for 3GPP 5G NR, the RAN may utilize either a non-interleaved mapping or an interleaved mapping. That is, a UE may assume that downlink data transmitted on the PDSCH utilizes either a non-interleaved or interleaved mapping scheme for mapping from VRBs to PRBs.

In simple terms, an interleaver performs frequency segmentation and shuffling. Frequency segmentation can include dividing frequency bandwidths into several segments or components. And shuffling basically shuffles among those segments or frequency components. For example, consider a wideband downlink transmission being conceptually divided into relatively small frequency segments. One frequency segment, or a group of frequency segments might suffer from interference or other channel quality issues. In this case, information received within those frequency segments might be lost. However, because an interleaver shuffles those frequency segments around, a UE receiving the interleaved transmission may be able to recover the partially corrupted data across the full bandwidth. That is, once any such problems are spread around the bandwidth, other protection like CRC checks at the UE can improve the likelihood of recovery.

Figure 6:
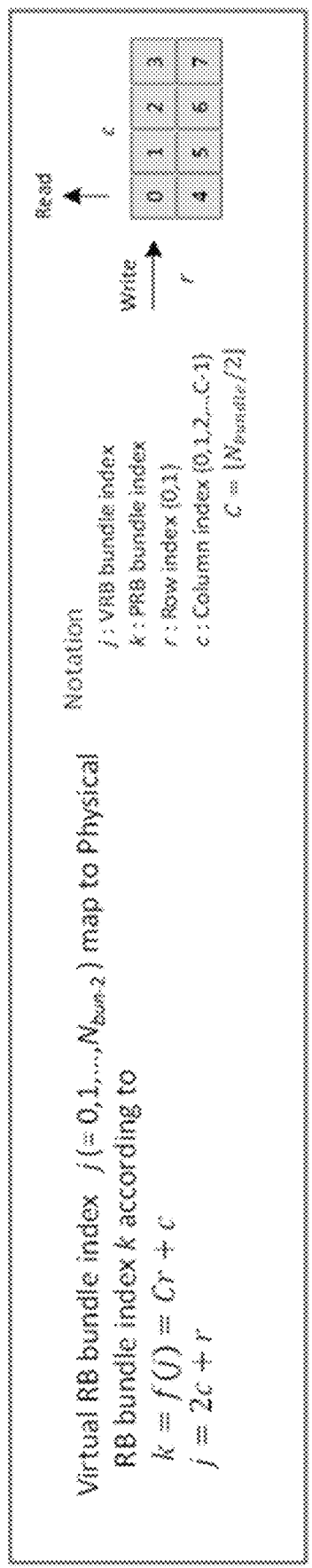
FIG. 6 is a schematic illustration of the operation of sample interleaver operations according to some aspects of the disclosure.

FIG. 6 schematically illustrates an example of an interleaving operation according to an aspect of the disclosure. The procedure shown in this illustration may be carried out by a base station corresponding to a downlink transmission, carrying out the operations specified in 3GPP specifications for 5G NR. And further, a de-interleaving operation at a receiving entity (e.g., a UE or base station) may reverse the described operation to recover the interleaved code block. Of course, this example is merely provided for clarity, and it is to be understood that interleaving and de-interleaving operations can be carried out by both transmit and receive devices including UEs and base stations, for uplink and downlink transmissions, as illustrated in FIG. 1.

As shown in FIG. 6, an interleaver may map a code block to parts (e.g., upper and lower parts) of a given bandwidth. According to some aspects, this can occur by dividing a code block into multiple sections (e.g., two or more sections). The multiple sections can be mapped to PRBs via respective parts of a bandwidth in a row-to-column fashion. Because this only results in a size-2 interleaver, the interleaving operation may be less robust than a higher-order interleaver such as one following 3GPP specifications for 4G LTE. That is, an NR interleaver may generally provide less frequency diversity than an LTE interleaver. As discussed above, this relative lack of frequency diversity may lead to issues when a UE derives a wideband CQI. And moreover, 5G NR specifications allow interleavers to be turned off completely, resulting in even less frequency diversity.

Compared to a non-interleaved mapping, an interleaved mapping from VRBs to PRBs provides improved frequency diversity and provides higher frequency-domain degrees of freedom. Yet in some cases, a frequency interleaver may impair the quality of a wideband CQI that is based on a simple average SPEF across the bandwidth, as discussed above. That is, a UE's calculation of a CQI over a wide bandwidth in this fashion could be susceptible to blocks of frequency within the channel having interference, or having a dip in the channel quality. Aspects disclosed herein, including frequency segmentation and CSF aggregation, aim to address such issues.

As described above, to obtain a wideband CQI, a conventional UE may generally divide a bandwidth into smaller-bandwidth segments, and take the average SPEF based on the CSI-RS or CSI-M across those segments. Yet when used in conjunction with a 5G NR interleaver, a wideband CQI based on such an averaged SPEF can potentially lead to inaccurate results. For example, the CQI may frequently be overestimated. This issue can lead to a high BLER, reduced throughput, and an unreliable link.

Therefore, in an aspect of the present disclosure, a frequency domain segmentation-based wideband CQI estimation approach to wideband CQI estimation is disclosed. This wideband CQI estimation approach takes the properties of the interleaver of 5G-NR into account, to provide an improved wideband CQI relative to the conventional approach when utilized in conjunction with the interleaver utilized in 5G NR. Contrary to the conventional simple average-based wideband CQI estimation, an approach according to an aspect of this disclosure derives a wideband CQI that is not based on all segments across the entire bandwidth. Rather, wideband CQI may be based on selected segments, where the segments are selected based on characteristics of the link.

Figure 7:
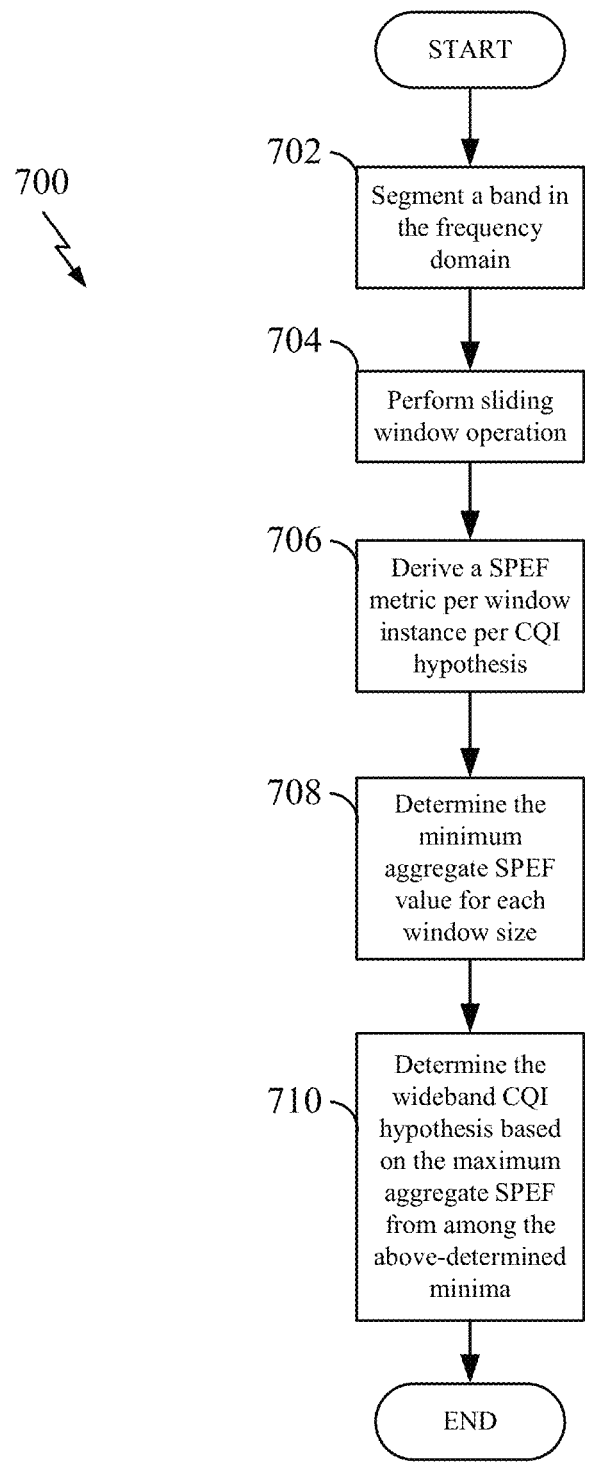
FIG. 7 is a flow chart illustrating an exemplary process for generating a wideband CQI according to some aspects of the disclosure.

FIG. 7 is a flow chart illustrating an exemplary process 700 for frequency domain segmentation-based wideband CQI estimation in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the UE 500 illustrated in FIG. 5. In some examples, the process 700 may be carried out by any suitable apparatus or means for carrying out the functions or algorithm described below.

At block 702, a UE may segment a given band in the frequency domain. That is, in an aspect of the disclosure, the UE may segment, divide, split, or partition the band into a plurality of segments. In the discussion that follows, a segment includes a set of one or more subbands, where a subband includes a set of two or more contiguous physical resource blocks (PRBs). The bandwidth of a given band may be any suitable frequency region including, not limited to, a bandwidth part (BWP), a frequency segment, and a carrier. The bandwidth also include any suitable number of subbands. For example, according to an example following 3GPP specifications for 5G NR, a subband size, in PRBs, corresponds to a configurable number of PRBs in a bandwidth part (BWP), according to Table 1 below.

TABLE 1

| Bandwidth part (PRBs) | Subband size (PRBs) |
| --- | --- |
| <24 | N/A |
| 24-72 | 4, 8 |
| 73-144 | 8, 16 |
| 145-275 | 16, 32 |

Here, the UE segments the band in the frequency domain by determining the size, in the frequency domain, of the segments (i.e., the segment bandwidth, or the number of subbands per segment) based on one or more parameters, such as a code block (CB) size, a rank, a modulation order corresponding to each CQI hypothesis, and/or a SPEF corresponding to each CQI hypothesis. The UE may determine the CB size based on a selected modulation and coding scheme (MCS), and the UE may select the rank as a part of the CSF procedure.

As one nonlimiting example, a UE may determine a segment size according to the following equation:

$$Segment\_Size = [CB\_Size/(Rank*SPEF)]/SB\_Size$$

Here, Segment_Size represents the segment size, in units of number of subbands. CB_Size represents the code block size. Rank represents the selected rank. SPEF represents a wideband SPEF corresponding to a given CQI hypothesis. The wideband SPEF as used in this equation may correspond to an average SPEF value across the full bandwidth of the wideband. And SB_Size represents the subband size, in units of number of tones or OFDM subcarriers.

Accordingly, the UE may divide the bandwidth into multiple sets of segments, with the segment sizes corresponding to CQI hypotheses.

At block 704, once a UE determines a segment size for each CQI hypotheses for the selected bandwidth, the UE may perform a sliding window operation. For example, each segment may be utilized as a window, and the UE may determine the average of the SPEF across each of the subbands within the window or segment, storing the average SPEF value in memory. The UE may determine the average of the SPEF across each of the PRBs within the window or segment, storing the average SPEF value in memory. The average of the SPEF across each of the subbands or PRBs within the segment may indicate an arithmetic mean value of the set of SPEFs (SPEFs of subbands or PRBs within the segment). However, it should be appreciated that the average is not necessarily an arithmetic mean value. It could be an aggregated value, a weighted mean value, a first order statistic vlaue, a second order statistic vlaue, or any statistical value calculated based on the set of SPEFs. A UE may utilize such a window across the entire bandwidth in a sliding window operation, sliding the window across the bandwidth one segment at a time, determining the average SPEF at each window position, and storing the average or aggregate SPEF in memory.

At block 706, the UE may derive a SPEF metric per window instance per CQI hypothesis. That is, in a further aspect of the disclosure, a UE may utilize a plurality of differently-sized windows, corresponding to each CQI hypothesis, in the fashion described above with respect to block 704. Here, the UE may determine a corresponding average SPEF for each window size.

At block 708, once the UE determines these average, or aggregate SPEF values for all the different window positions, utilizing each of a plurality of window sizes (corresponding to each CQI hypothesis), the UE may then determine a minimum average SPEF value for each window size. That is, the UE may determine, for each CQI hypothesis, the segment within the segment length that has a minimum average SPEF value. Accordingly, for each CQI hypothesis, the UE may select a corresponding (selected minimum) average SPEF.

According to some examples, a UE may not necessarily select the absolute minimum average SPEF value for each CQI hypothesis. As one example, a UE may utilize a suitable threshold value to exclude SPEF values that fall below a threshold SPEF value. That is, for a given CQI hypothesis, if a determined SPEF value falls below a suitable threshold SPEF value, then the UE may exclude that value, and instead, select as a minimum average SPEF value the smallest average SPEF that falls above the threshold. The use of such a threshold is optional and may be excluded in other examples.

In still another example, for each CQI hypothesis, the UE may select as a "minimum" average SPEF value any suitable SPEF value within a given percentile of the SPEF values determined for that CQI hypothesis. For example, the UE may designate as a minimum SPEF value, an average SPEF that falls within the first or second percentile among the average SPEF values for that CQI hypothesis. And in still another example, statistics of extreme values or order statistics may be utilized to designate a given average SPEF value as a minimum SPEF value for a given CQI hypothesis. Accordingly, within the present disclosure, when referring to a minimum average SPEF value, it is to be understood that the designated minimum need not necessarily be the absolute minimum average SPEF value for a given CQI hypothesis.

At block 710, once a UE determines a minimum average SPEF value for each CQI hypothesis, the UE may determine the wideband CQI hypothesis. Here, the UE can then use various means to select between different CQI hypotheses. In an aspect of the present disclosure, the UE may determine, from among the above-determined minima, a maximum average SPEF. The UE selects the CQI hypothesis corresponding to this selected maximum SPEF as the wideband CQI.

According to some examples, the UE may not necessarily select the absolute maximum among the minimum average SPEF values for each CQI hypothesis. As one example, the UE may select as a "maximum" any suitable one from among the minimum average SPEF values determined above in step 708. For example, the UE may designate as a maximum among the minimum SPEF values, a minimum average SPEF value that falls above the $98^{th}$ or $99^{th}$ percentile among the minimum average SPEF values. And in still another example, statistics of extreme values or order statistics may be utilized to designate a given minimum average SPEF value as a maximum. Accordingly, within the present disclosure, when referring to a maximum among the minimum average SPEF values, it is to be understood that the designated maximum need not necessarily be the absolute maximum among the minimum average SPEF values.

FIG. 8 shows one exemplary table that a UE may utilize in coordination with the above-described algorithm to determine a wideband CQI according to some aspects of the disclosure. In this table, each row corresponds to a different CQI hypothesis 830. This table includes 15 rows, corresponding to 15 different CQI hypotheses (CQI 1-CQI 15) 830. While any suitable number of rows, corresponding to different numbers of CQI hypotheses may be utilized within the scope of this disclosure, currently extant 3GPP standards for 5G NR support 15 CQI hypotheses.

The table is grouped into four sets of four columns 810. Each group 810 of four columns corresponding to a different rank 810: namely, Rank 1, Rank 2, Rank 3, and Rank 4. This configuration corresponds to a UE that supports up to Rank 4 link, although this is merely one example. That is, within the scope of this disclosure, a table may be utilized with any suitable number of ranks.

Within each group of columns (i.e., within each Rank) are four separate columns 820 representing four different subband sizes 820. The subband size 820 is determined by the network, and in some examples, can take the values shown: subband size 820 of 4, 8, 16, or 32 PRBs. This example corresponds to the subband sizing options provided in 3GPP specifications for 5G NR, as described above and provided in Table 1. Of course, this is merely one example, and within the scope of this disclosure, a table having any suitable number of subband sizes, of any suitable sizes, may be utilized.

The UE may select a rank 810 from this table. In various examples, the UE may select a particular rank 811 for any of a number of suitable reasons. In some examples, the UE may select a particular rank 811, and proceed with the following windowing operation only for the selected rank 811. In other examples, the UE may proceed with the following windowing operation for a plurality of ranks 810

(e.g., for all ranks in the table), and may then select the rank 811 that maximizes the wideband SPEF, as described further below.

The value in each cell 840 in the table represents a segment size, in units of number of subbands.

For example, assume that the network configures a UE for subband size 821 of 4 PRBs, corresponding to the left-most column for each Rank 810. Considering Rank 1 811, for each CQI hypothesis 830 (i.e., for each row in the table), the UE performs a windowing operation as described above. For example, for CQI 1 831, at row 1, the UE divides the bandwidth into segments having a size of 1150 size-4 subbands 841 (i.e., subbands that include 4 PRBs each). For each of these segments, the UE determines an average of the SPEF, and extracts the minimum average SPEF from among these segments. For CQI 2 832, at row 2, the UE divides the bandwidth into segments having a size of 465 size-4 subbands 842. For each of these segments, the UE once again determines an average of the SPEF, and extracts the minimum average SPEF from among these segments. The UE continues through the table for each row, corresponding to each CQI hypothesis, down to CQI 15. For CQI 15, at row 15, the UE divides the bandwidth into segments having a size of 24 size-4 subbands 843. For each of these segments, the UE determines an average of the SPEF, and extracts the minimum average SPEF from among these segments.

Once the UE has completed this windowing operation for all CQI hypotheses, the UE then determines the maximum average SPEF from among the minimum values determined above for each CQI hypothesis. The CQI hypothesis that corresponds to the maximum average SPEF can then become the wideband CQI.

As discussed above, in some examples, the UE may perform this operation for each potential Rank: in an example utilizing this table, this would include Ranks 1, 2, 3, and 4. Here, once the UE determines a CQI hypothesis for each rank that corresponds to a maximum average SPEF among determined minimum average SPEF values for each Rank, the UE may then select a rank based on which rank provides the highest maximum average SPEF.

Figure 9:
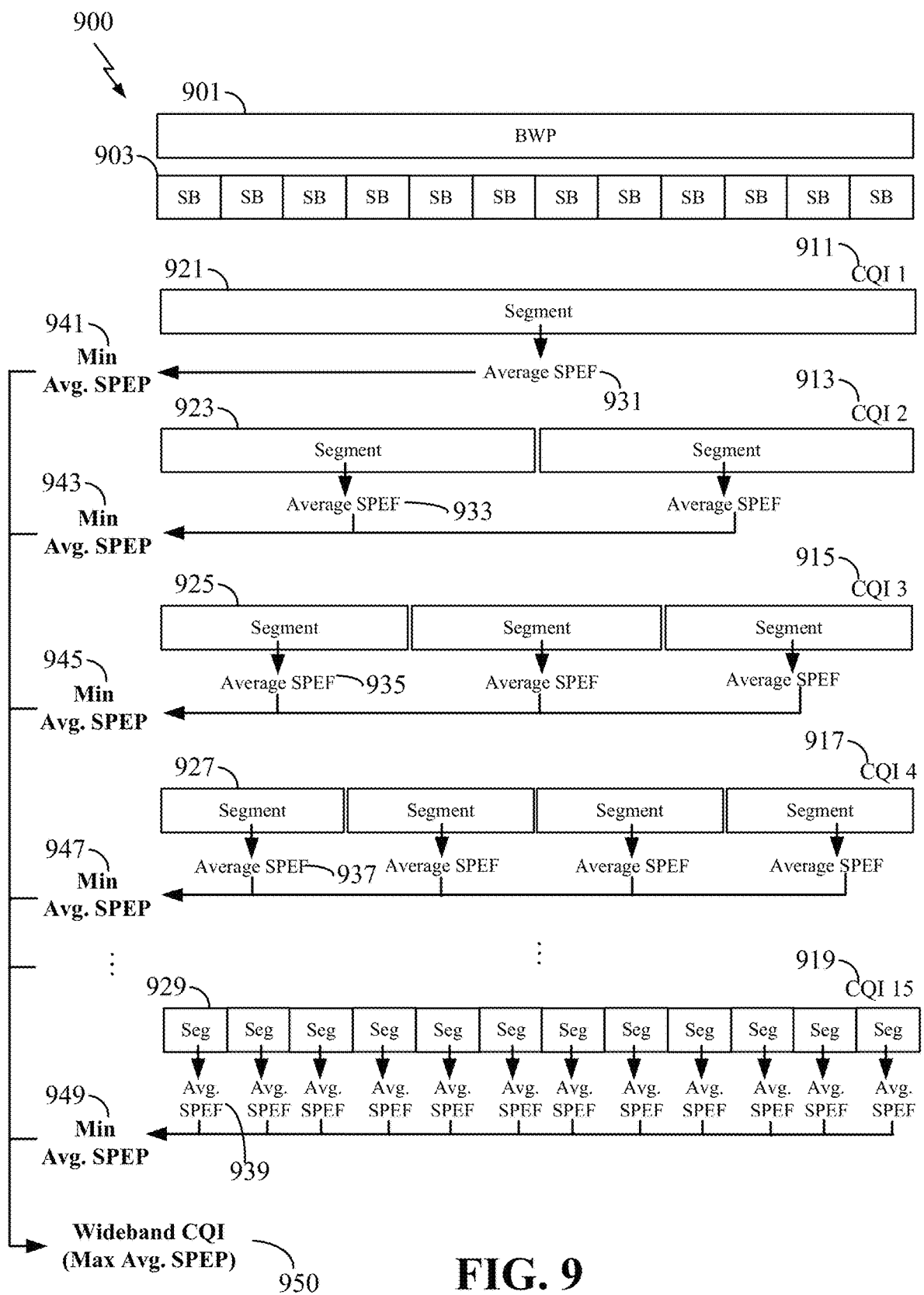
FIG. 9 is a schematic illustration for generating a wideband CQI according to some aspects of the disclosure.

FIG. 9 shows one exemplary algorithm that a UE may utilize to determine a wideband CQI according to some aspects of the disclosure. A bandwidth part 901 may be given to the UE for communications. The bandwidth part 901 may include any suitable number of subbands 903. A subband size, in units of number of PRBs, may be given to the UE based on a configurable number of PRBs in the bandwidth part. The UE may divide the bandwidth part into one or more segments for each of CQI hypotheses (e.g., CQI 1-CQI 15). That is, for each CQI hypothesis, the UE may partition the bandwidth part 901 into a number of segments. The number of segments in the bandwidth part 901 may depend on the size of the bandwidth part 901 and the size of the segment. The UE may determine the size of the segment, in units of number of subbands, based on one or more parameters, such as a code block (CB) size, a rank, a subband size, a modulation order corresponding to each CQI hypothesis, and a SPEF corresponding to each CQI hypothesis. For example, the bandwidth 901 includes 12 subbands in FIG. 9. The UE may divide the bandwidth part 901 into one segment 921 for CQI 1 (911). That is, the size of the segment 921, in units of number of subbands, is 12 subbands. When the subband size, in units of number of PRBs, is four, the size of the segment 921, in units of number of PRBs, is 48 PRBs. If the subband size is different from four, the size of the segment 921, in units of number of PRBs, would change based on the subband size. The UE may divide the bandwidth part 901 into two segments 923 for CQI 2 (913), into three segments 925 for CQI 3 (215), and into four segments 927 for CQI 4 (917). The UE may divide the bandwidth part 901 into a number of segments for CQI 5-CQI 14, and into 12 segments 929 for CQI 15 (919). Each segment of 12 segments 929 for CQI 15 (919) may include one subband 903. Of course, the number of segments in a bandwidth part 901 is not limited to the example shown in FIG. 9. The number of segments in a bandwidth may change based on the size of the bandwidth part and the size of the segment.

Once a UE divides the selected bandwidth 901 into a plurality of frequency segments for each of a plurality of CQI hypotheses, the UE may perform a sliding window operation. The sliding window operation is to determine an average SPEF 931, 933, 935, 937, and 939 of each frequency segment 921, 923, 925, 927, and 929 for each of the plurality of CQI hypotheses 911, 913, 915, 917, and 919. For example, for CQI 1 (911), the UE assigns one segment 921 in the bandwidth 901. The UE may determine the average SPEF 931 corresponding to the segment 921 based on estimated SPEFs of PRBs in the segment 921 or estimated SPEFs of subbands 903 in the segment 921. The UE may determine the average SPEF of the segment such that each SPEF of PRBs or subbands in the segment is added together and the sum of SPEFs is divided by the total number of PRBs or subbands in the segment. For CQI 1 (911), there is one average SPEF 931 because the UE assigns one segment 921 in the bandwidth. For CQI 2 (913), the UE assigns two segments 923 in the bandwidth 901. The UE may determine the average SPEF 933 corresponding to each of the two segments 923 based on estimated SPEFs of PRBs in the corresponding segment 923 or estimated SPEFs of subbands 903 in the corresponding segment 923. Since the UE assigns two segments in the bandwidth for CQI 2 (913), two average SPEFs 933 for CQI 2 (913) 933 exist. For CQI 3 (915), there are three segments 925 in the bandwidth 901. The UE may determine the average SPEF 935 corresponding to each of the three segments 925 based on estimated SPEFs of PRBs in the corresponding segment 925 or estimated SPEFs of subbands 903 in the corresponding segment 925. Since there are three segments for CQI 3 (915), three average SPEFs 935 for CQI 3 (915) exist. The UE may determine the average SPEFs for CQI 4-CQI 14 in a similar way elaborated above. Finally, for CQI 15 (919), there are 12 segments 929 in the bandwidth 901. The UE may determine the average SPEF 939 corresponding to each of the 12 segments 929 based on estimated SPEFs of PRBs in the corresponding segment 929 or estimated SPEFs of subbands 903 in the corresponding segment 929. Since there are twelve segments for CQI 15 (919), twelve average SPEFs 939 for CQI 15 (919) exist.

Once the UE determines these SPEF averages of all window instances or segments for each CQI hypothesis, the UE may determine a minimum average SPEF from among the average SPEFs of segments for each CQI hypothesis. That is, the UE may select a lowest average SPEF among one or more average SPEFs of segments for each CQI hypothesis. For example, for CQI 1 (911), there is one average SPEF 931. Thus, the minimum average SPEF 941 is the one average SPEF 931. For CQI 2 (913), there are two average SPEFs 933. The UE may select the lowest average SPEF 943 between two average SPEFs 933. The lowest average SPEF is the minimum average SPEF 943. For CQI 3 (915), there are three average SPEFs 935. The UE may select one of three average SPEFs 935. The selected average SPEF 945 is the minimum average SPEF 945 and has the lowest average SPEF among three average SPEFs. The UE may determine a minimum average SPEF for CQI 4-CQI 14 in a similar way elaborated above. Finally, for CQI 15 (919), there are 12 average SPEFs 939. The UE may select one average SPEF 949 of 12 average SPEFs 939. The selected average SPEF is the minimum average SPEF 949 and has the lowest average SPEF 949 for CQI 15 (919). Of course, the illustration above is an example. It should be appreciated that a UE may not necessarily select the absolute minimum average SPEF value for each CQI hypothesis. Once the UE determines these minimum average SPEFs 941, 943, 945, 947, 949 of all CQI hypotheses, the UE may select, as a wideband CQI, a CQI hypothesis from among the plurality of CQI hypotheses. The selected CQI hypothesis may correspond to a maximum SPEF from among the minimum average SPEFs corresponding to the plurality of CQI hypotheses (e.g., CQI 1-15). For example, each CQI hypothesis (CQI 1-CQI 15) 911, 913, 915, 917, and 919 has a minimum average SPEF 941, 943, 945, 947, and 949. That is, there are 15 minimum average SPEFs for all CQI hypotheses. The UE may select a maximum SPEF among those 15 minimum average SPEFs. The maximum SPEF corresponds to the wideband CQI 950.

Figure 10:
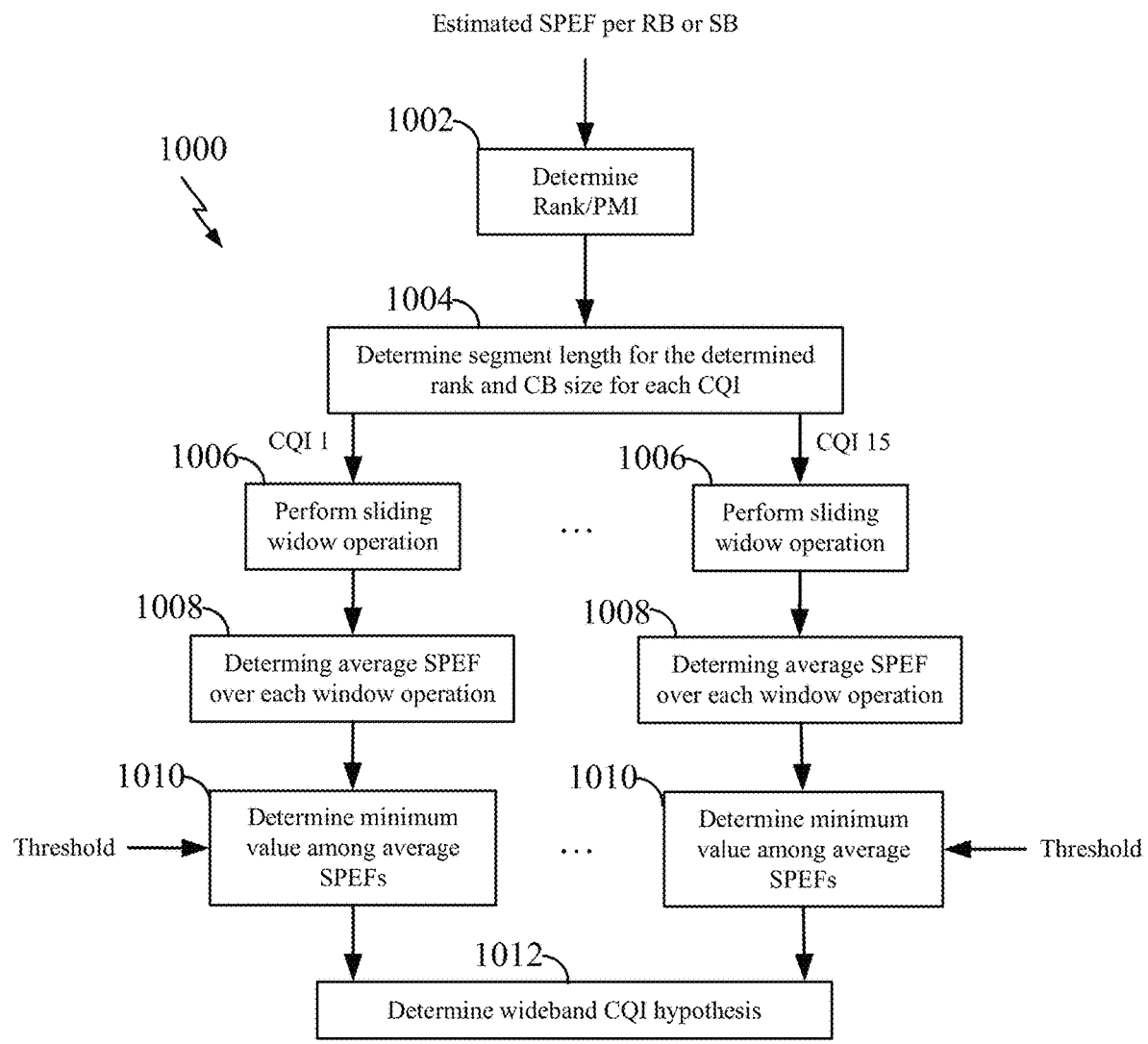
FIG. 10 is a flow chart illustrating an exemplary process for generating a wideband CQI according to some aspects of the disclosure.

FIG. 10 is a flow chart illustrating another exemplary process 1000 for frequency domain segmentation-based wideband CQI estimation in accordance with some aspects of the disclosure. As described below, some or all illustrated features may be omitted in a particular implementation within the scope of the present disclosure, and some illustrated features may not be required for implementation of all embodiments. In some examples, the process 1000 may be carried out by the UE 500 illustrated in FIG. 5. In some examples, the process 1000 may be carried out by any suitable apparatus or means for carrying out the functions or algorithm described below.

At block 1002, the UE may determine a Rank and PMI for a wideband CQI. At block 1004, the UE may determine a segment length for the selected Rank, and a code block (CB) size of interest for each CQI hypothesis.

For each CQI hypothesis CQI 1-CQI 15, the UE may then perform a sliding window operation 1006 described above, determining an average SPEF over each window operation 1008 and determining the minimum of these average SPEF values 1010.

In some examples, the UE may utilize a suitable threshold value to exclude minimum SPEF values that fall below a minimum threshold SPEF. That is, for a given CQI hypothesis, if the determined minimum SPEF value falls below a suitable threshold SPEF value, then the UE may exclude that value, and instead, select as the minimum average SPEF value the smallest average SPEF that falls above the threshold. The use of such a threshold is optional and may be excluded in other examples.

Finally, at block 1012, the UE may determine the wideband CQI hypothesis, corresponding to the maximum average SPEF value from the above-determined minima.

Figure 11:
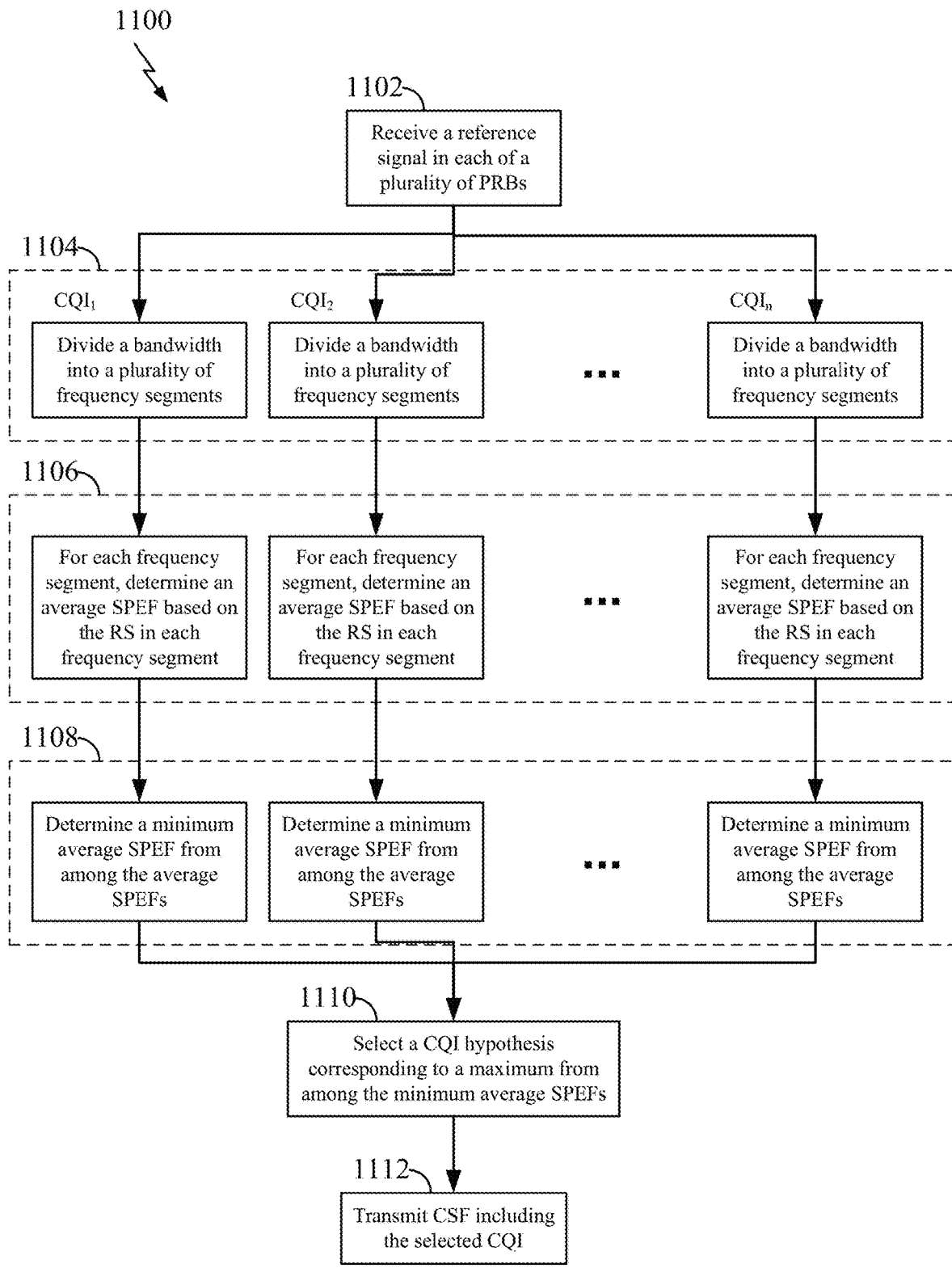
FIG. 11 is a flow chart illustrating another exemplary process for generating a wideband CQI according to some aspects of the disclosure.

FIG. 11 is a flow chart illustrating another exemplary process 1100 for frequency domain segmentation-based wideband CQI estimation in accordance with some aspects of the disclosure. As described below, some or all illustrated features may be omitted in a particular implementation within the scope of the present disclosure, and some illustrated features may not be required for implementation of all embodiments. In some examples, the process 1100 may be carried out by the UE 500 illustrated in FIG. 5. In some examples, the process 1100 may be carried out by any suitable apparatus or means for carrying out the functions or algorithm described below.

At block 1102, a UE may receive a reference signal (RS) in each of a plurality of physical resource blocks (PRBs). At block 1104, for each of a plurality (e.g., n) of channel quality indicator (CQI) hypotheses, the UE may divide a bandwidth into a plurality of frequency segments. Here, each of the frequency segments may include a respective set of one or more of the PRBs, such that the frequency segments for each CQI hypothesis differ in bandwidth from a bandwidth of frequency segments for each other CQI hypothesis. At block 1106, for each of the plurality of CQI hypotheses, the UE may determine, for each frequency segment corresponding to that CQI hypothesis, an average spectral efficiency (SPEF) based on the RS in each PRB of the corresponding frequency segment.

At block 1108, for each of the plurality of CQI hypotheses, the UE may determine a minimum average SPEF from among the average SPEFs determined for the corresponding CQI hypothesis. In some examples, here, the UE may exclude any determined average SPEF that falls below a SPEF threshold value, such that the determined minimum average SPEF is the lowest average SPEF falling above the SPEF threshold value.

At block 1110, the UE may select, as a selected CQI, a CQI hypothesis from among the plurality of CQI hypotheses corresponding to a maximum from among the minimum average SPEFs. And at block 1112 the UE may transmit channel state feedback (CSF) including the selected CQI.

Various examples of the generation of a channel quality indicator (CQI) corresponding to a given bandwidth, as described herein, are shown below.

Clause 1: A method, apparatus, and non-transitory computer-readable medium for a wireless user equipment (UE) to generate a channel quality indicator (CQI) corresponding to a bandwidth that comprises a plurality of physical resource blocks (PRBs), the method comprising: receiving a reference signal in each of the plurality of PRBs; for each of a plurality of CQI hypotheses, dividing the bandwidth into a plurality of frequency segments, each frequency segment of the plurality of frequency segments comprising a respective set of the plurality of PRBs; for each of the plurality of CQI hypotheses, determining, for each frequency segment for the corresponding CQI hypothesis, an average spectral efficiency (SPEF) based on the reference signal in each PRB of the corresponding frequency segment; for each of the plurality of CQI hypotheses, determining a minimum average SPEF from among the average SPEFs corresponding to the plurality of frequency segments for the corresponding CQI hypothesis; selecting, as a selected CQI, a CQI hypothesis from among the plurality of CQI hypotheses, the CQI hypothesis corresponding to a maximum SPEF from among the minimum average SPEFs corresponding to the plurality of CQI hypotheses; and transmitting a channel state feedback comprising the selected CQI.

Clause 2: The method of any of clauses 1 and 3-8, wherein the determining the minimum average SPEF for each of the plurality of CQI hypotheses comprises excluding any determined average SPEF that falls below a SPEF threshold value, such that the determined minimum average SPEF is the lowest average SPEF falling above the SPEF threshold value.

Clause 3: The method of any of clauses 1-2 further comprising: for each of the plurality of CQI hypotheses, determining a number of the plurality of PRBs in a frequency segment of the plurality of the frequency segments based on at least one of: a rank, a code block size for the corresponding CQI hypothesis, or a SPEF corresponding to the bandwidth for the corresponding CQI hypothesis.

Clause 4: The method of any of clauses 1-2, wherein for each of the plurality of CQI hypotheses, each frequency segment comprises a respective set of a plurality of subbands for the corresponding CQI hypothesis, each subband comprising a respective subband set of the plurality of PRBs.

Clause 5: The method of clauses 4 further comprising: for each of the plurality of CQI hypotheses, determining a number of the plurality of subbands in a frequency segment of the plurality of the frequency segments based on at least one of: a rank, a code block size for the corresponding CQI hypothesis, a SPEF corresponding to the bandwidth for the corresponding CQI hypothesis, or a total number of PRBs in a subband of the plurality of subbands.

Clause 6: The method of clause 5, wherein the number of the plurality of subbands is determined by the code block size divided by the rank, the SPEF corresponding to the bandwidth, and the total number of PRBs in the subband of the plurality of subbands.

Clause 7: The method of any of clauses 4-5, wherein the determining the average SPEF for each frequency segment comprises: for each of the plurality of CQI hypotheses, determining, for each subband of the plurality of subbands for the corresponding CQI hypothesis, an average SPEF for the corresponding subband; and for each of the plurality of CQI hypotheses, determining, for each frequency segment for the corresponding CQI hypothesis, the average SPEF for the corresponding segment based on the average SPEFs corresponding to the respective set of the plurality of subbands for the corresponding segment.

Clause 8: The method of any of clauses 1-7, wherein the selecting the CQI hypothesis from among the plurality of CQI hypotheses comprises: for each of a plurality of ranks, selecting a rank-specific CQI hypothesis from among the plurality of CQI hypotheses, the rank-specific CQI hypothesis corresponding to a maximum SPEF from among the minimum average SPEFs corresponding to the plurality of CQI hypotheses; and selecting, as the selected CQI, a wideband CQI hypothesis from among the rank-specific CQI hypotheses corresponding to the plurality of ranks, the wideband CQI hypothesis corresponding to a maximum SPEF from among the maximum SPEFs corresponding to the rank-specific CQI hypotheses.

Other examples of the generation of a channel quality indicator (CQI) corresponding to a given bandwidth, as described herein, are shown below.

Clause 1: A method, apparatus, and non-transitory computer-readable medium for a wireless user equipment (UE), the method comprising: receiving a plurality of reference signals in a plurality of physical resource blocks (PRBs) corresponding to a bandwidth; for each of a plurality of CQI hypotheses: dividing the bandwidth into one or more frequency segments, a frequency segment of the one or more frequency segments comprising a set of the plurality of PRBs; determining one or more average spectral efficiencies (SPEFs) corresponding to the one or more frequency segments based on one or more sets of reference signals of the plurality of reference signals corresponding to the one or more frequency segments; and selecting a first SPEF from among the one or more average SPEFs; and selecting a second SPEF from among a plurality of first SPEFs corresponding to the plurality of CQI hypotheses; selecting, for the bandwidth, a wideband CQI hypothesis from among the plurality of CQI hypotheses, the wideband CQI hypothesis corresponding to the second SPEF; and transmitting a channel state feedback comprising the wideband CQI.

Clause 2: The method of clause 1, wherein the selecting the first SPEF comprises: selecting, as the first SPEF, a minimum average SPEF from among the one or more average SPEFs.

Clause 3: The method of clause 2, wherein the selecting, as the first SPEF, the minimum average SPEF comprises: excluding any determined average SPEF that falls below a SPEF threshold value, such that the determined minimum average SPEF is the lowest average SPEF falling above the SPEF threshold value.

Clause 4: The method of clause 1, wherein the selecting the second SPEF comprises: selecting, as the second SPEF, a maximum average SPEF from among the one or more average SPEFs.

Clause 5: The method of claim 1 further comprising: for each of the plurality of CQI hypotheses, determining a number of the plurality of PRBs in the frequency segment of the one or more frequency segments based on at least one of: a rank, a code block size for the corresponding CQI hypothesis, or a SPEF corresponding to the bandwidth for the corresponding CQI hypothesis.

Clause 6: The method of clause 1, wherein for each of the plurality of CQI hypotheses, the frequency segment comprises a plurality of subbands, a subband of the plurality of subbands comprising another set of the plurality of PRBs, the method further comprising: for each of the plurality of CQI hypotheses, determining a number of the plurality of subbands in the frequency segment of the one or more frequency segments based on at least one of: a rank, a code block size for the corresponding CQI hypothesis, a SPEF corresponding to the bandwidth for the corresponding CQI hypothesis, or a total number of PRBs in the subband of the plurality of subbands.

Clause 7: The method of clause 6, wherein the determining one or more average SPEFs comprises: determining a plurality of average SPEFs corresponding to the plurality of subbands; and determining the one or more average SPEFs corresponding to the one or more frequency segments based on one or more sets of average SPEFs of the plurality of average SPEFs corresponding to the one or more frequency segments.

Clause 8: The method of clause 1, wherein the selecting, for the bandwidth, the wideband CQI hypothesis from among the plurality of CQI hypotheses comprises: for each of a plurality of ranks, selecting a rank-specific CQI hypothesis from among the plurality of CQI hypotheses, the rank-specific CQI hypothesis corresponding to a maximum SPEF from among the minimum average SPEFs corresponding to the plurality of CQI hypotheses; and selecting a wideband CQI hypothesis from among a plurality of rank-specific CQI hypotheses corresponding to the plurality of ranks, the wideband CQI hypothesis corresponding to a wideband maximum SPEF from among a plurality of maximum SPEFs corresponding to the rank-specific CQI hypotheses.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The invention claimed is:

1. A method of wireless communication operable at a user equipment (UE), the method comprising:
   receiving a plurality of reference signals associated with a plurality of physical resource blocks (PRBs) corresponding to a bandwidth;
   for each of a plurality of channel quality indicator (CQI) hypotheses:
      determining one or more average spectral efficiencies (SPEFs) corresponding to one or more frequency segments of the bandwidth based on one or more sets of reference signals of the plurality of reference signals corresponding to the one or more frequency segments; and
      selecting a first SPEF from among the one or more average SPEFs; and
   selecting a second SPEF from among a plurality of first SPEFs corresponding to the plurality of CQI hypotheses; and
   transmitting channel state feedback comprising a wideband CQI corresponding to the second SPEF.

2. The method of claim 1, wherein the selecting the first SPEF comprises:
   selecting, as the first SPEF, a minimum average SPEF from among the one or more average SPEFs.

3. The method of claim 2, wherein the selecting, as the first SPEF, the minimum average SPEF comprises:
   excluding any determined average SPEF that falls below a SPEF threshold value, such that the determined minimum average SPEF is the lowest average SPEF falling above the SPEF threshold value.

4. The method of claim 1, wherein the selecting the second SPEF comprises:
   selecting, as the second SPEF, a maximum average SPEF from among the one or more average SPEFs.

5. The method of claim 1, wherein for each of the plurality of CQI hypotheses, a frequency segment of the one or more frequency segments comprises a set of the plurality of PRBs, the method further comprising:
   for each of the plurality of CQI hypotheses, determining a number of the plurality of PRBs in the frequency segment of the one or more frequency segments based on at least one of: a rank, a code block size for the corresponding CQI hypothesis, or a SPEF corresponding to the bandwidth for the corresponding CQI hypothesis.

6. The method of claim 1, wherein for each of the plurality of CQI hypotheses, a frequency segment of the one or more frequency segments comprises a plurality of subbands, a subband of the plurality of subbands comprising a set of the plurality of PRBs,
   the method further comprising:

for each of the plurality of CQI hypotheses, determining a number of the plurality of subbands in the frequency segment of the one or more frequency segments based on at least one of: a rank, a code block size for the corresponding CQI hypothesis, a SPEF corresponding to the bandwidth for the corresponding CQI hypothesis, or a total number of PRBs in the subband of the plurality of subbands.

7. The method of claim 6, wherein the determining one or more average SPEFs comprises:
determining a plurality of average SPEFs corresponding to the plurality of subbands; and
determining the one or more average SPEFs corresponding to the one or more frequency segments based on one or more sets of average SPEFs of the plurality of average SPEFs corresponding to the one or more frequency segments.

8. The method of claim 1, wherein the selecting the second SPEF from among the plurality of first SPEFs corresponding to the plurality of CQI hypotheses comprises:
for each of a plurality of ranks, selecting a rank-specific SPEF among the plurality of first SPEFs corresponding to the plurality of CQI hypotheses, the rank-specific SPEF corresponding to a maximum SPEF from among the plurality of first SPEFs; and
selecting the second SPEF from among a plurality of rank-specific SPEFs corresponding to the plurality of ranks, the second SPEF corresponding to a maximum SPEF from among the plurality of rank-specific SPEFs.

9. A user equipment (UE) configured for wireless communication, the UE comprising:
a processor;
a transceiver communicatively coupled to the processor; and
a memory communicatively coupled to the processor,
wherein the processor and the memory are configured for:
receiving a plurality of reference signals associated with a plurality of physical resource blocks (PRBs) corresponding to a bandwidth;
for each of a plurality of channel quality indicator (CQI) hypotheses:
determining one or more average spectral efficiencies (SPEFs) corresponding to one or more frequency segments of the bandwidth based on one or more sets of reference signals of the plurality of reference signals corresponding to the one or more frequency segments; and
selecting a first SPEF from among the one or more average SPEFs; and
selecting a second SPEF from among a plurality of first SPEFs corresponding to the plurality of CQI hypotheses; and
transmitting channel state feedback comprising a wideband CQI corresponding to the second SPEF.

10. The UE of claim 9, wherein the selecting the first SPEF comprises:
selecting, as the first SPEF, a minimum average SPEF from among the one or more average SPEFs.

11. The UE of claim 10, wherein the selecting, as the first SPEF, the minimum average SPEF comprises:
excluding any determined average SPEF that falls below a SPEF threshold value, such that the determined minimum average SPEF is the lowest average SPEF falling above the SPEF threshold value.

12. The UE of claim 9, wherein the selecting the second SPEF comprises:
selecting, as the second SPEF, a maximum average SPEF from among the one or more average SPEFs.

13. The UE of claim 9, for each of the plurality of CQI hypotheses, a frequency segment of the one or more frequency segments comprises a set of the plurality of PRBs,
wherein the processor and the memory are further configured for:
for each of the plurality of CQI hypotheses, determining a number of the plurality of PRBs in the frequency segment of the one or more frequency segments based on at least one of: a rank, a code block size for the corresponding CQI hypothesis, or a SPEF corresponding to the bandwidth for the corresponding CQI hypothesis.

14. The UE of claim 9, wherein for each of the plurality of CQI hypotheses, a frequency segment of the one or more frequency segments comprises a plurality of subbands, a subband of the plurality of subbands comprising a set of the plurality of PRBs,
wherein the processor and the memory are further configured for:
for each of the plurality of CQI hypotheses, determining a number of the plurality of subbands in the frequency segment of the one or more frequency segments based on at least one of: a rank, a code block size for the corresponding CQI hypothesis, a SPEF corresponding to the bandwidth for the corresponding CQI hypothesis, or a total number of PRBs in the subband of the plurality of subbands.

15. The UE of claim 14, wherein the determining one or more average SPEFs comprises:
determining a plurality of average SPEFs corresponding to the plurality of subbands; and
determining the one or more average SPEFs corresponding to the one or more frequency segments based on one or more sets of average SPEFs of the plurality of average SPEFs corresponding to the one or more frequency segments.

16. The UE of claim 9, wherein the selecting the second SPEF from among the plurality of first SPEFs corresponding to the plurality of CQI hypotheses comprises:
for each of a plurality of ranks, selecting a rank-specific SPEF among the plurality of first SPEFs corresponding to the plurality of CQI hypotheses, the rank-specific SPEF corresponding to a maximum SPEF from among the plurality of first SPEFs; and
selecting the second SPEF from among a plurality of rank-specific SPEFs corresponding to the plurality of ranks, the second SPEF corresponding to a maximum SPEF from among the plurality of rank-specific SPEFs.

17. A user equipment (UE) configured for wireless communication, the UE comprising:
means for receiving a plurality of reference signals associated with a plurality of physical resource blocks (PRBs) corresponding to a bandwidth;
for each of a plurality of channel quality indicator (CQI) hypotheses:
means for determining one or more average spectral efficiencies (SPEFs) corresponding to one or more frequency segments of the bandwidth based on one or more sets of reference signals of the plurality of reference signals corresponding to the one or more frequency segments; and
means for selecting a first SPEF from among the one or more average SPEFs; and means for selecting a second SPEF from among a plurality of first SPEFs corresponding to the plurality of CQI hypotheses; and means for transmitting channel state feedback comprising a wideband CQI corresponding to the second SPEF.

18. The UE of claim 17, wherein the means for selecting the first SPEF comprises:
means for selecting, as the first SPEF, a minimum average SPEF from among the one or more average SPEFs.

19. The UE of claim 18, wherein the means for selecting, as the first SPEF, the minimum average SPEF comprises:
means for excluding any determined average SPEF that falls below a SPEF threshold value, such that the determined minimum average SPEF is the lowest average SPEF falling above the SPEF threshold value.

20. The UE of claim 17, wherein the means for selecting the second SPEF comprises:
means for selecting, as the second SPEF, a maximum average SPEF from among the one or more average SPEFs.

21. The UE of claim 17, wherein for each of the plurality of CQI hypotheses, a frequency segment of the one or more frequency segments comprises a plurality of subbands, a subband of the plurality of subbands comprising a set of the plurality of PRBs,
the UE further comprising:
for each of the plurality of CQI hypotheses, means for determining a number of the plurality of subbands in the frequency segment of the one or more frequency segments based on at least one of: a rank, a code block size for the corresponding CQI hypothesis, a SPEF corresponding to the bandwidth for the corresponding CQI hypothesis, or a total number of PRBs in the subband of the plurality of subbands.

22. The UE of claim 21, wherein the means for determining one or more average SPEFs comprises:
means for determining a plurality of average SPEFs corresponding to the plurality of subbands; and
means for determining the one or more average SPEFs corresponding to the one or more frequency segments based on one or more sets of average SPEFs of the plurality of average SPEFs corresponding to the one or more frequency segments.

23. The UE of claim 17, wherein the means for selecting the second SPEF from among the plurality of first SPEFs corresponding to the plurality of CQI comprises:
for each of a plurality of ranks, means for selecting a rank-specific SPEF among the plurality of first SPEFs corresponding to the plurality of CQI hypotheses, the rank-specific SPEF corresponding to a maximum SPEF from among the plurality of first SPEFs; and
means for selecting the second SPEF from among a plurality of rank-specific SPEFs corresponding to the plurality of ranks, the second SPEF corresponding to a maximum SPEF from among the plurality of rank-specific SPEFs.

24. A non-transitory computer readable medium storing computer executable code, comprising code for wireless communication operable at a user equipment (UE), the code comprising:
instructions for causing the UE to:
receive a plurality of reference signals associated with a plurality of physical resource blocks (PRBs) corresponding to a bandwidth;
for each of a plurality of channel quality indicator (CQI) hypotheses:
determine one or more average spectral efficiencies (SPEFs) corresponding to one or more frequency segments of the bandwidth based on one or more sets of reference signals of the plurality of reference signals corresponding to the one or more frequency segments; and
select a first SPEF from among the one or more average SPEFs; and
select a second SPEF from among a plurality of first SPEFs corresponding to the plurality of CQI hypotheses; and
transmit channel state feedback comprising a wideband CQI corresponding to the second SPEF.

25. The non-transitory computer readable medium of claim 24, wherein the instructions for causing the UE to select the first SPEF are configured for selecting, as the first SPEF, a minimum average SPEF from among the one or more average SPEFs determine the minimum average SPEF for each of the plurality of CQI hypotheses.

26. The non-transitory computer readable medium of claim 25, wherein the instructions for causing the UE to select, as the first SPEF, the minimum average SPEF are configured for excluding any determined average SPEF that falls below a SPEF threshold value, such that the determined minimum average SPEF is the lowest average SPEF falling above the SPEF threshold value.

27. The non-transitory computer readable medium of claim 24, wherein the instructions for causing the UE to select the second SPEF are configured for selecting, as the second SPEF, a maximum average SPEF from among the one or more average SPEFs.

28. The non-transitory computer readable medium of claim 24, wherein for each of the plurality of CQI hypotheses, a frequency segment of the one or more frequency segments comprises a plurality of subbands, a subband of the plurality of subbands comprising another set of the plurality of PRBs,
the code further comprising:
for each of the plurality of CQI hypotheses, instructions for causing the UE to determine a number of the plurality of subbands in the frequency segment of the one or more frequency segments based on at least one of: a rank, a code block size for the corresponding CQI hypothesis, a SPEF corresponding to the bandwidth for the corresponding CQI hypothesis, or a total number of PRBs in the subband of the plurality of subbands.

29. The non-transitory computer readable medium of claim 28, wherein the instructions for causing the UE to determine one or more average SPEFs are configured for:
determining a plurality of average SPEFs corresponding to the plurality of subbands; and
determining the one or more average SPEFs corresponding to the one or more frequency segments based on one or more sets of average SPEFs of the plurality of average SPEFs corresponding to the one or more frequency segments.

30. The non-transitory computer readable medium of claim 24, wherein the instructions for causing the UE to select the second SPEF from among the plurality of first SPEFs corresponding to the plurality of CQI are configured for:
for each of a plurality of ranks, selecting a rank-specific SPEF among the plurality of first SPEFs corresponding to the plurality of CQI hypotheses, the rank-specific SPEF corresponding to a maximum SPEF from among the plurality of first SPEFs; and selecting the second SPEF from among a plurality of rank-specific SPEFs corresponding to the plurality of ranks, the second SPEF corresponding to a maximum SPEF from among the plurality of rank-specific SPEFs.

\* \* \* \* \*